(12) United States Patent
Haube et al.

(10) Patent No.: US 10,476,608 B2
(45) Date of Patent: Nov. 12, 2019

(54) NETWORK INTERFACE DEVICES WITH UPSTREAM NOISE SUPPRESSORS

(71) Applicant: PPC BROADBAND, INC., East Syracuse, NY (US)

(72) Inventors: Richard A. Haube, East Syracuse, NY (US); Paul Bailey, Camillus, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 16/033,974

(22) Filed: Jul. 12, 2018

(65) Prior Publication Data

US 2019/0036620 A1    Jan. 31, 2019

Related U.S. Application Data

(60) Provisional application No. 62/537,509, filed on Jul. 27, 2017.

(51) Int. Cl.
*H04B 15/00* (2006.01)
*H04N 21/61* (2011.01)
(Continued)

(52) U.S. Cl.
CPC ....... *H04B 15/00* (2013.01); *H04N 21/44245* (2013.01); *H04N 21/6168* (2013.01); *H04B 3/46* (2013.01)

(58) Field of Classification Search
CPC ....... H04B 15/00; H04B 3/46; H04N 21/6168
(Continued)

(56) References Cited

U.S. PATENT DOCUMENTS

| 4,327,446 A | 4/1982 | Dressler |
| 7,499,397 B1 | 3/2009 | Monk et al. |

(Continued)

FOREIGN PATENT DOCUMENTS

| WO | 2014/062933 A1 | 4/2014 |
| WO | 2017/123717 A1 | 7/2017 |

OTHER PUBLICATIONS

Non-Final Office Action dated Feb. 8, 2019, U.S. Appl. No. 15/417,859, filed Jan. 27, 2017, pp. 1-22.
(Continued)

*Primary Examiner* — Shuwang Liu
*Assistant Examiner* — Fitwi Y Hailegiorgis
(74) *Attorney, Agent, or Firm* — MH2 Technology Law Group LLP

(57) ABSTRACT

A network interface device includes an input-output port; an entry port; an upstream signal path configured to carry an upstream signal from the input-output port to the entry port; a noise suppressor, in the upstream signal path, that includes noise suppression paths between the input-output and entry ports; and a controller configured to: determine a first power level of the upstream signal in a first frequency band; determine a second power level of the upstream signal in a second frequency band; generate a control signal based on a first comparison of the first and second power levels, on a second comparison of the second power level with a threshold limit, or on the first comparison of the first and second power levels and on the second comparison of the second power level with the threshold limit; and select one of the noise suppression paths based on the control signal.

17 Claims, 4 Drawing Sheets

(51) Int. Cl.
*H04N 21/442* (2011.01)
*H04B 3/46* (2015.01)

(58) Field of Classification Search
USPC .......................................... 375/257; 725/127
See application file for complete search history.

(56) References Cited

U.S. PATENT DOCUMENTS

| | | |
|---|---|---|
| 8,667,550 B2 | 3/2014 | Wang |
| 2007/0060186 A1 | 3/2007 | Ganesan |
| 2010/0095344 A1 | 4/2010 | Newby et al. |
| 2010/0100919 A1 | 4/2010 | Hsue et al. |
| 2010/0191525 A1 | 7/2010 | Rabenko |
| 2010/0244980 A1 | 9/2010 | Olson et al. |
| 2010/0251320 A1 | 9/2010 | Shafer et al. |
| 2010/0251323 A1 | 9/2010 | Jackson |
| 2011/0099601 A1* | 4/2011 | Riggsby .................. H04N 7/22 725/127 |
| 2013/0223229 A1 | 8/2013 | Hui |
| 2014/0105221 A1 | 4/2014 | Bailey |
| 2015/0208137 A1 | 7/2015 | Alrutz |
| 2017/0195126 A1 | 7/2017 | Brooks et al. |
| 2018/0167148 A1* | 6/2018 | Vannucci ............. H04B 17/101 |

OTHER PUBLICATIONS

Lee W. Young (Authorized Officer), International Search Report and Written Opinion dated Apr. 6, 2017, PCT Application No. PCT/US2017/013134, filed Jan. 12, 2017, pp. 1-16.

Shane Thomas (Authorized Officer), International Search Report and Written Opinion dated May 23, 2017, PCT Application No. PCT/US2017/015313, filed Jan. 27, 2017, pp. 1-10.

Erdogan Alkan et al., "Dynamic Noise Mitigation Device", U.S. Appl. No. 15/417,859, filed Jan. 27, 2017.

Paul Bailey et al., "Network Interface Device With Dynamic Noise Conditioning", U.S. Appl. No. 15/404,540, filed Jan. 12, 2017.

Paul Bailey et al., "Network Interface Device With Dynamic Noise Conditioning", U.S. Appl. No. 16/117,809, filed Aug. 30, 2018.

Blaine R. Copenheaver (Authorized Officer), International Search Report and Written Opinion dated Sep. 21, 2018, PCT Application No. PCT/US2018/041861, filed Jul. 12, 2018, pp. 1-14.

* cited by examiner

NETWORK INTERFACE DEVICES WITH UPSTREAM NOISE SUPPRESSORS

FIELD

The present disclosure relates to cable television ("CATV") networks, and more particularly to CATV network interface devices which interconnect subscriber equipment at subscribers' premises to the CATV network infrastructure.

BACKGROUND

CATV networks supply and distribute high frequency "downstream" signals from a main signal distribution facility, known as a "headend," to premises (e.g., homes and offices) of subscribers. The downstream signals can be provided to subscriber equipment, such as televisions, telephones, and computers. In addition, most CATV networks also receive "upstream" signals from subscriber equipment back to the headend of the CATV network. For example, a set-top box can send upstream signals including information for selecting programs for viewing on a television. Also, upstream and downstream signals are used by personal computers connected through the CATV infrastructure to the Internet. Further, voice over Internet protocol ("VOIP") telephones use upstream and downstream signals to communicate telephone conversations.

CATV networks use filters and other components to reduce or eliminate unwanted signals that enter the CATV network from external sources, such as subscriber equipment. These undesirable external signals, known as "ingress noise," can degrade valid CATV signals and general quality of the CATV network. The most intense range of undesirable ingress noise is in the frequency band of 0 megahertz ("MHz")-15 MHz. This range overlaps those of valid upstream CATV signals, which have a frequency band of 5 MHz-42 MHz. Because the undesirable ingress noise and valid upstream signals can occupy the same frequency band and originate from approximately the same location, it is extremely difficult to filter undesirable ingress noise from valid upstream signals.

Additionally, because valid downstream CATV signals are within a frequency band of 54 MHz-1000 MHz, the ingress noise frequency band of 0 MHz-15 MHz does not overlap and can be suppressed by downstream filters. Even so, the ingress noise can still have adverse influence on the valid downstream signals because ingress noise from individual subscribers accumulates as a substantial underlying level of base noise on the CATV network. To distinguish valid CATV signals from the base noise, the valid CATV signals are typically amplified above the base noise level. However, a high level of base noise may cause signal amplifiers to clip or distort both the valid downstream and upstream signals during amplification and retransmission of those signals, which reduces the information contained in those valid signals, and thereby diminishes the quality of service experienced by subscribers.

SUMMARY

The present disclosure is directed to network interface devices. In some examples, a network interface device comprises: an input-output port, an entry port, an upstream signal path, a noise suppressor, and a controller. The upstream signal path is configured to carry an upstream signal from the input-output port to the entry port. The noise suppressor, in the upstream signal path, comprises first and second noise suppression paths between the input-output port and the entry port. The controller is configured to: determine a first power level of the upstream signal in a lower frequency band; determine a second power level of the upstream signal in a higher frequency band; generate a control signal based on a first comparison of the first and second power levels, on a second comparison of the second power level with a threshold limit, or on the first comparison of the first and second power levels and on the second comparison of the second power level with the threshold limit; and select one of the first and second noise suppression paths based on the control signal.

In some examples, the noise suppressor further comprises a switch configured to: receive the upstream signal from the input-output port; and direct the upstream signal to the one of the first and second noise suppression paths based on the control signal.

In some examples, both of the first and second noise suppression paths apply a different level of filtering to the upstream signal.

In some examples, the controller is further configured to select the first noise suppression path in response to determining that a scaled first power level is greater than the second power level, or in response to determining that the second power level is greater than the threshold limit.

In some examples, the lower frequency band overlaps with the higher frequency band.

In some examples, the lower frequency band does not overlap with the higher frequency band.

In some examples, a network interface device comprises: an input-output port, an entry port, an upstream signal path, a noise suppressor, and a controller. The upstream signal path is configured to carry an upstream signal from the input-output port to the entry port. The controller is configured to: determine a first power level of the upstream signal in a first frequency band; determine a second power level of the upstream signal in a second frequency band; and generate a control signal based on a first comparison of the first and second power levels, on a second comparison of the second power level with a threshold limit, or on the first comparison of the first and second power levels and on the second comparison of the second power level with the threshold limit. The noise suppressor is configured to pass the upstream signal via the upstream signal path or to block the upstream signal based on the control signal.

In some examples, the noise suppressor is further configured to block the upstream signal in response to determining that a scaled first power level is greater than the second power level.

In some examples, the noise suppressor is further configured to block the upstream signal in response to determining that the second power level is greater than the threshold limit.

In some examples, the noise suppressor is further configured to block the upstream signal in response to determining that a scaled first power level is greater than the second power level, or in response to determining that the second power level is greater than the threshold limit.

In some examples, a network interface device comprises: an input-output port, an entry port, an upstream signal path, a noise suppressor, and a controller. The upstream signal path is configured to carry an upstream signal from the input-output port to the entry port. The noise suppressor, in the upstream signal path, comprises a plurality of noise suppression paths between the input-output port and the entry port. The controller is configured to: determine a first power level of the upstream signal in a first frequency band; determine a second power level of the upstream signal in a second frequency band; generate a control signal based on a first comparison of the first and second power levels, on a second comparison of the second power level with a threshold limit, or on the first comparison of the first and second power levels and on the second comparison of the second power level with the threshold limit; and select one of the plurality of noise suppression paths based on the control signal.

In some examples, the noise suppressor further comprises a switch configured to: receive the upstream signal from the input-output port; and direct the upstream signal to the one of the plurality of noise suppression paths based on the control signal.

In some examples, each of the plurality of noise suppression paths applies a different level of filtering to the upstream signal.

In some examples, a first noise suppression path of the plurality of noise suppression paths entirely blocks the upstream signal.

In some examples, the controller is further configured to select the first noise suppression path in response to determining that a scaled first power level is greater than the second power level, or in response to determining that the second power level is greater than the threshold limit.

In some examples, a first noise suppression path of the plurality of noise suppression paths provides no filtering to the upstream signal.

In some examples, a first noise suppression path of the plurality of noise suppression paths entirely blocks the upstream signal, and a second noise suppression path of the plurality of noise suppression paths provides no filtering to the upstream signal.

In some examples, the first frequency band includes lower frequencies than the second frequency band.

In some examples, the first frequency band overlaps with the second frequency band.

In some examples, the first frequency band does not overlap with the second frequency band.

Additionally, the present disclosure is directed to methods of limiting ingress noise in network interface devices. In some examples, a method of limiting ingress noise in a network interface devices comprises: determining a first power level of an upstream signal in a first frequency band; determining a second power level of the upstream signal in a second frequency band; generating a control signal based on a first comparison of the first and second power levels, on a second comparison of the second power level with a threshold limit, or on the first comparison of the first and second power levels and on the second comparison of the second power level with the threshold limit; and, based on the control signal, selecting one of a plurality of noise suppression paths between an input-output port of the network interface device and an entry port of the network interface device.

In some examples, a method of limiting ingress noise in a network interface devices comprises: determining a first power level of the upstream signal in a first frequency band; determining a second power level of the upstream signal in a second frequency band; generating a control signal based on a first comparison of the first and second power levels, on a second comparison of the second power level with a threshold limit, or on the first comparison of the first and second power levels and on the second comparison of the second power level with the threshold limit; and based, on the control signal, passing the upstream signal via the upstream signal path or blocking the upstream signal.

BRIEF DESCRIPTION OF THE DRAWINGS

The above and/or other aspects and advantages will become more apparent and more readily appreciated from the following detailed description of examples, taken in conjunction with the accompanying drawings, in which.

DETAILED DESCRIPTION

Figure 1:
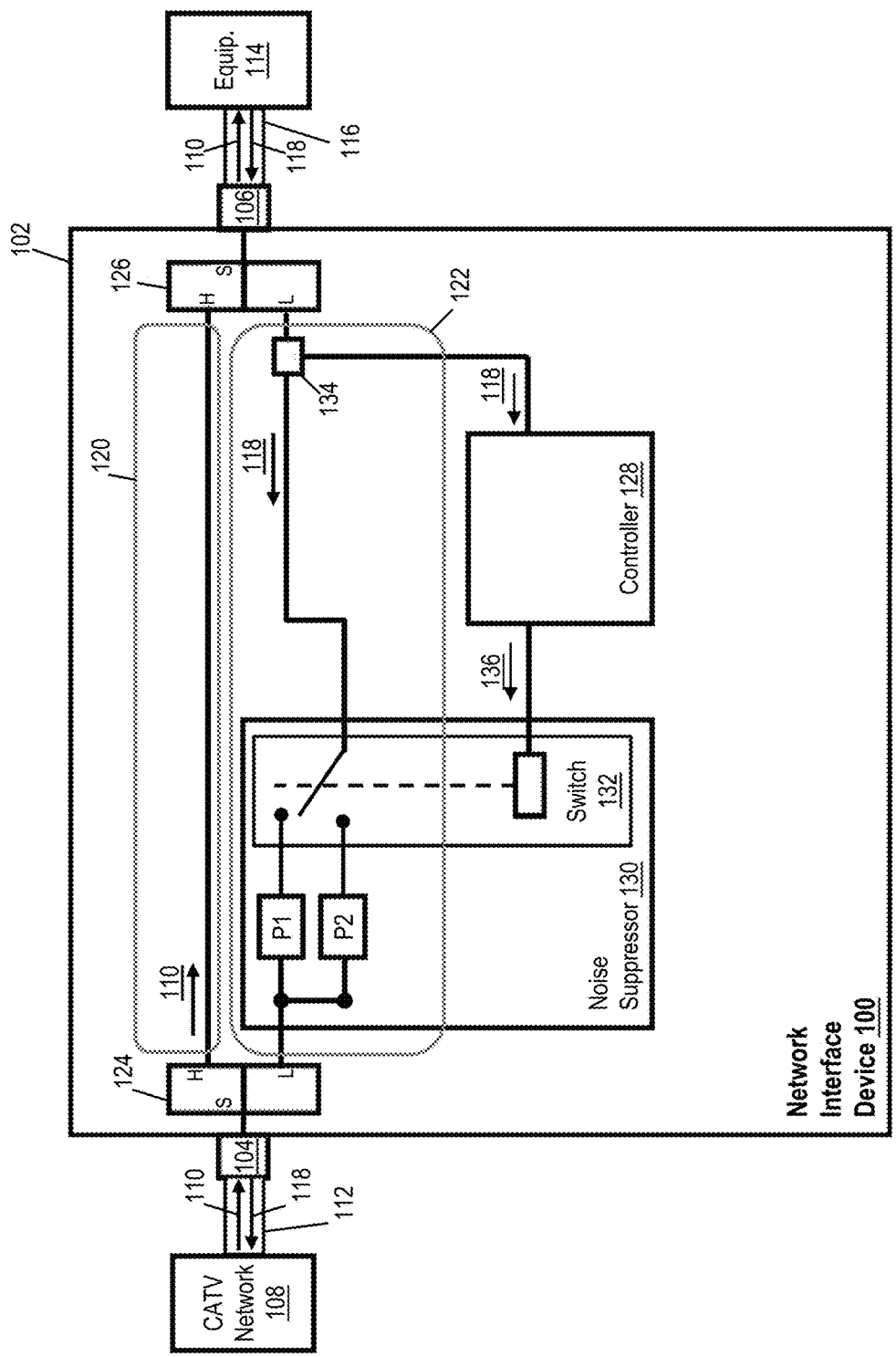
FIG. 1 is a functional block diagram illustrating an exemplary network interface device in accordance with aspects of the present disclosure.

Exemplary aspects will now be described more fully with reference to the accompanying drawings. Examples of the disclosure, however, may be embodied in many different forms and should not be construed as being limited to the examples set forth herein. Rather, these examples are provided so that this disclosure will be thorough and complete, and will fully convey the scope to those skilled in the art. In the drawings, some details may be simplified and/or may be drawn to facilitate understanding rather than to maintain strict structural accuracy, detail, and/or scale. For example, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, or section could be termed a second element, component, region, layer, or section without departing from the teachings of examples.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation(s) depicted in the figures.

The terminology used herein is for the purpose of describing particular examples only and is not intended to be limiting of examples. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which examples belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Devices and methods in accordance with the present disclosure inhibit the amount of ingress noise introduced from subscriber equipment to a CATV network while avoiding loss of information in valid upstream signals. Network interface devices consistent with the present disclosure may detect and differentiate between ingress noise and valid transmission in an upstream signal by dynamically determining an ingress noise threshold. Additionally, the interface devices selectively route the upstream signal through one of a number of noise suppression paths based on the dynamic ingress noise threshold.

FIG. 1 illustrates a functional block diagram of network interface device 100 in accordance with aspects of the present disclosure. Network interface device 100 includes housing 102 having entry port 104 and input-output port 106. Network interface device 100 may be connected to CATV network 108 via entry port 104. Downstream signal 110 originating from programming sources at a headend of CATV network 108 may be conducted to network interface device 100 through entry port 104 via drop cable 112. Network interface device 100 may provide downstream signal 110 to equipment 114 (e.g., VOIP telephones, television sets, and/or data modems) via input-output port 106 and subscriber cable 116. In the reverse direction, equipment 114 may communicate with CATV network 108 via network interface device 100 by conducting upstream signal 118 to input-output port 106 via subscriber cable 116. Network interface device 100 may conduct upstream signal 118 to CATV network 108 via entry port 104 and drop cable 112.

Network interface device 100 includes downstream signal path 120 that communicates downstream signal 110 between CATV network 108 and equipment 114 via entry port 104 and input-output port 106. Network interface device 100 also includes upstream signal path 122 that communicates upstream signal 118 between equipment 114 and CATV network 108 via input-output port 106 and entry port 104. Downstream signal path 120 and upstream signal path 122 are physical (e.g., wired) communication links that electrically connect entry port 104 and input-output port 106. Upstream diplexer 124 may be connected to entry port 104. Downstream diplexer 126 may be connected to input-output port 106. Upstream diplexer 124 and downstream diplexer 126 may split and/or combine downstream signal 110 and upstream signal 118. For example, downstream signal 110 and upstream signal 118 may be conducted together in drop cable 112 and/or subscriber cable 116, and then may be split by upstream diplexer 124 and downstream diplexer 126 such that they are separately communicated within housing 102 though a respective one of downstream signal path 120 and upstream signal path 122. Additionally, upstream diplexer 124 and downstream diplexer 126 may combine downstream signal 110 and upstream signal 118 for transmission together in drop cable 112 and/or subscriber cable 116.

In implementations, downstream signal path 120 may directly communicate downstream signal 110 from entry port 104 to input-output port 106 without any intervening components or devices. However, it is understood that other implementations of downstream signal path 120 may include one or more components for amplifying, conditioning, and/or splitting downstream signal 110.

In accordance with aspects of the present disclosure, upstream signal path 122 includes controller 128 and noise suppressor 130. Noise suppressor 130 includes switch 132 that receives upstream signal 118 from input-output port 106 (e.g., from equipment 114 via subscriber cable 116, input-output port 106, downstream diplexer 126, and splitter device 134), and selectively directs upstream signal 118 through one of a number of noise suppression paths P1 or P2 based on control signal 136 from controller 128. Noise suppression paths P1 and P2 apply different levels of filtering to upstream signal 118 according to an evaluation by controller 128 of the difference in power between two frequency bands (e.g., low and high) included in upstream signal 118, according to an evaluation by controller 128 of the power in a single frequency band (e.g., high) included in upstream signal 118 versus a threshold limit, or according to both evaluations. In implementations, noise suppression path P1 entirely blocks upstream signal 118 when, for example, a scaled low frequency band power level is greater than a high frequency band power level for first minimum length of time (that may or may not be predetermined), when the high frequency band power level is greater than the threshold limit for a second minimum length of time (that may or may not be predetermined), or both. Noise suppression path P2 provides no filtering to upstream signal 118 when, for example, the scaled low frequency band power level is not greater than the high frequency band power level for the first minimum length of time and the high frequency band power level is not greater than the threshold limit for the second minimum length of time. While noise suppressor 130 is illustrated as including two paths, some of implementations of noise suppressor 130 may include three or more paths.

It should be noted that the first minimum length of time may be less than the second minimum length of time, the first minimum length of time may be equal to the second minimum length of time, or the first minimum length of time may be greater than the second minimum length of time.

Controller 128 includes signal processing devices and/or data processing devices that evaluate noise included in upstream signal 118 and output control signal 136, which controls switch 132 of noise suppressor 130 to select one of noise suppression paths P1 or P2. Controller 128 may receive a small sample of upstream signal 118 in upstream signal path 122 from input-output port 106 via splitter device 134 (e.g., a one-in/two-out splitter, a directional coupler, or a tap resistor). The small sample of upstream signal 118 provided by splitter device 134 does not adversely load or disrupt upstream signal 118 along upstream signal path 122.

Using upstream signal 118, controller 128 may determine a scaled low frequency band power level and a high frequency band power level. In implementations, controller 128 may determine the scaled low frequency band power level by filtering upstream signal 118 to produce a low frequency band portion of upstream signal 118, converting the low frequency band portion to a first direct current ("DC") voltage, and then scaling the first DC voltage. Controller 128 also may determine the high frequency band power level by filtering upstream signal 118 to produce a high frequency band portion of upstream signal 118, and then converting the high frequency band portion to a second DC voltage.

In implementations, if controller 128 determines that upstream signal 118 has significant noise ingress in the low frequency band, significant noise ingress in the high frequency band, or significant noise ingress in the low and high frequency bands, then controller 128 controls switch 132 of noise suppressor 130 to select noise suppression path P1. Noise suppression path P1 may be an open circuit or it may be terminated to ground potential. If controller 128 determines that upstream signal 118 has little to no noise ingress in the low frequency band and little to no noise ingress in the high frequency band, then controller 128 controls switch 132 of noise suppressor 130 to select noise suppression path P2. Noise suppression path P2 passes upstream signal 118 substantially without filtering or amplification (e.g., no filtering or amplification).

Figure 2:
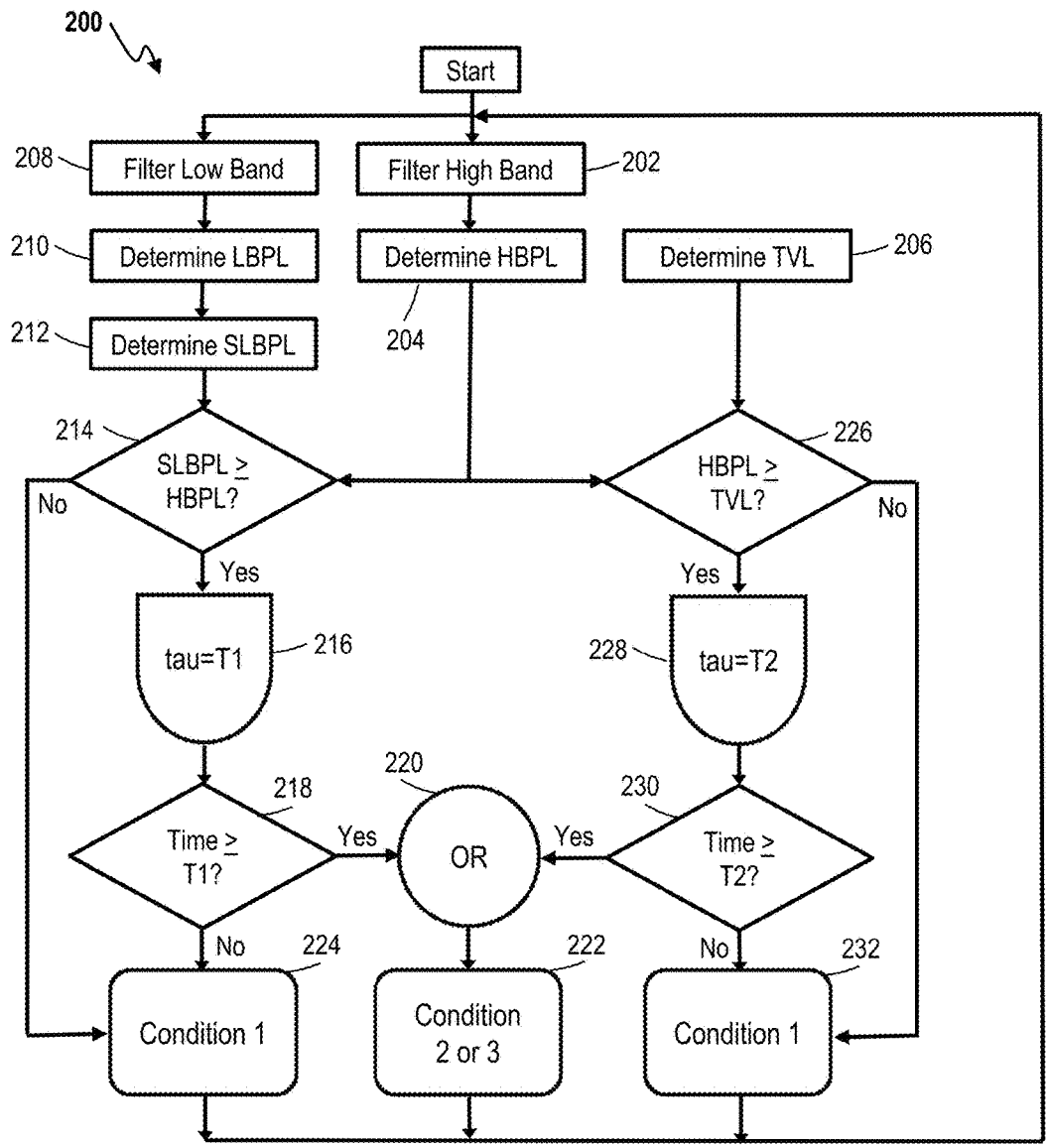
FIG. 2 is a flow chart illustrating an exemplary process for dynamically controlling ingress noise with an interface device in accordance with aspects of the present disclosure.

FIG. 2 illustrates a flow diagram of process 200 for controlling ingress noise with a network interface device (e.g., network interface device 100) in accordance with aspects of the present disclosure. At 202, process 200 filters upstream signal 118 using, for example, a high-pass filter. At 204, process 200 determines a high band power level ("HBPL") of filtered upstream signal 118. At 206, process 200 determines a threshold voltage level ("TVL").

At 208, process 200 filters upstream signal 118 using, for example, a low-pass filter. At 210, process 200 determines a low band power level ("LBPL") of filtered upstream signal 118. At 212, process 200 determines a scaled low band power level ("SLBPL") of this filtered upstream signal 118.

At 214, process 200 compares scaled low band power level ("SLBPL") of filtered upstream signal 118 with high band power level ("HBPL") of filtered upstream signal 118. At 214, if the SLBPL is greater than or equal to the HBPL (SLBPL≥HBPL?=Yes), then at 216, process 200 tracks elapsed time during which the SLBPL continuously remains greater than or equal to the HBPL and also determines an internal time constant τ=T1 (that may or may not be predetermined). At 218, process 200 compares the elapsed time to internal time constant τ=T1. If the elapsed time is greater than or equal to internal time constant τ=T1 (Time≥T1?=Yes), then at 218, process 200 sends a logic signal (high) to OR gate 220, indicative of Condition 2 (e.g., SLBPL≥HBPL?=Yes for a period of elapsed time greater than or equal to internal time constant τ=T1) at 222, so that noise suppression path P1 (e.g., block) is selected to disconnect or terminate upstream signal path 122, avoiding or minimizing contributions to base noise within a CATV network.

At 214, if the SLBPL is less than the HBPL (SLBPL≥HBPL?=No), this is indicative of Condition 1 at 224, so that noise suppression path P2 (e.g., pass) is selected to facilitate upstream signal path 122. At 218, if the elapsed time is less than internal time constant τ=T1 (Time≥T1?=No), then at 218, process 200 sends a logic signal (low) to OR gate 220, indicative of Condition 1 at 224, so that noise suppression path P2 (e.g., pass) is selected to facilitate upstream signal path 122. Noise suppression path P2 may pass upstream signal 118 to an upstream port (e.g., entry port 104) substantially without any filtering, attenuation, or other conditioning to address ingress noise.

At 226, process 200 compares high band power level ("HBPL") of filtered upstream signal 118 to threshold voltage level ("TVL"). At 226, if the HBPL is greater than or equal to the TVL (HBPL≥TVL?=Yes), then at 228, process 200 tracks elapsed time during which the HBPL continuously remains greater than or equal to the TVL and also determines an internal time constant τ=T2 (that may or may not be predetermined). At 230, process 200 compares the elapsed time to internal time constant τ=T2. If the elapsed time is greater than or equal to internal time constant τ=T2 (Time≥T2?=Yes), then at 230, process 200 sends a logic signal (high) to OR gate 220, indicative of Condition 3 (e.g., HBPL≥TVL?=Yes for a period of elapsed time greater than or equal to internal time constant τ=T2) at 222, so that noise suppression path P1 (e.g., block) is selected to disconnect or terminate upstream signal path 122, avoiding or minimizing contributions to base noise within a CATV network.

At 226, if the HBPL is less than the TVL (HBPL≥TVL?=No), this is indicative of Condition 1 at 232, so that noise suppression path P2 (e.g., pass) is selected to facilitate upstream signal path 122. At 230, if the elapsed time is less than internal time constant τ=T2 (Time≥T2?=No), then at 230, process 200 sends a logic signal (low) to OR gate 220, indicative of Condition 1 at 232, so that noise suppression path P2 (e.g., pass) is selected to facilitate upstream signal path 122. Noise suppression path P2 may pass upstream signal 118 to an upstream port (e.g., entry port 104) substantially without any filtering, attenuation, or other conditioning to address ingress noise.

It should be noted that T1 may be less than T2, T1 may be equal to T2, or T1 may be greater than T2.

Many portions of process 200 may occur in parallel and/or simultaneously. For example, the filtering at 202 and 208 may occur in parallel and/or simultaneously. In another example, the determinations at 204, 206, and 210 may occur in parallel and/or simultaneously. In yet another example, the comparisons at 214 and 226 may occur in parallel and/or simultaneously. In still another example, the comparisons at 218 and 230 may occur in parallel and/or simultaneously.

Figure 3:
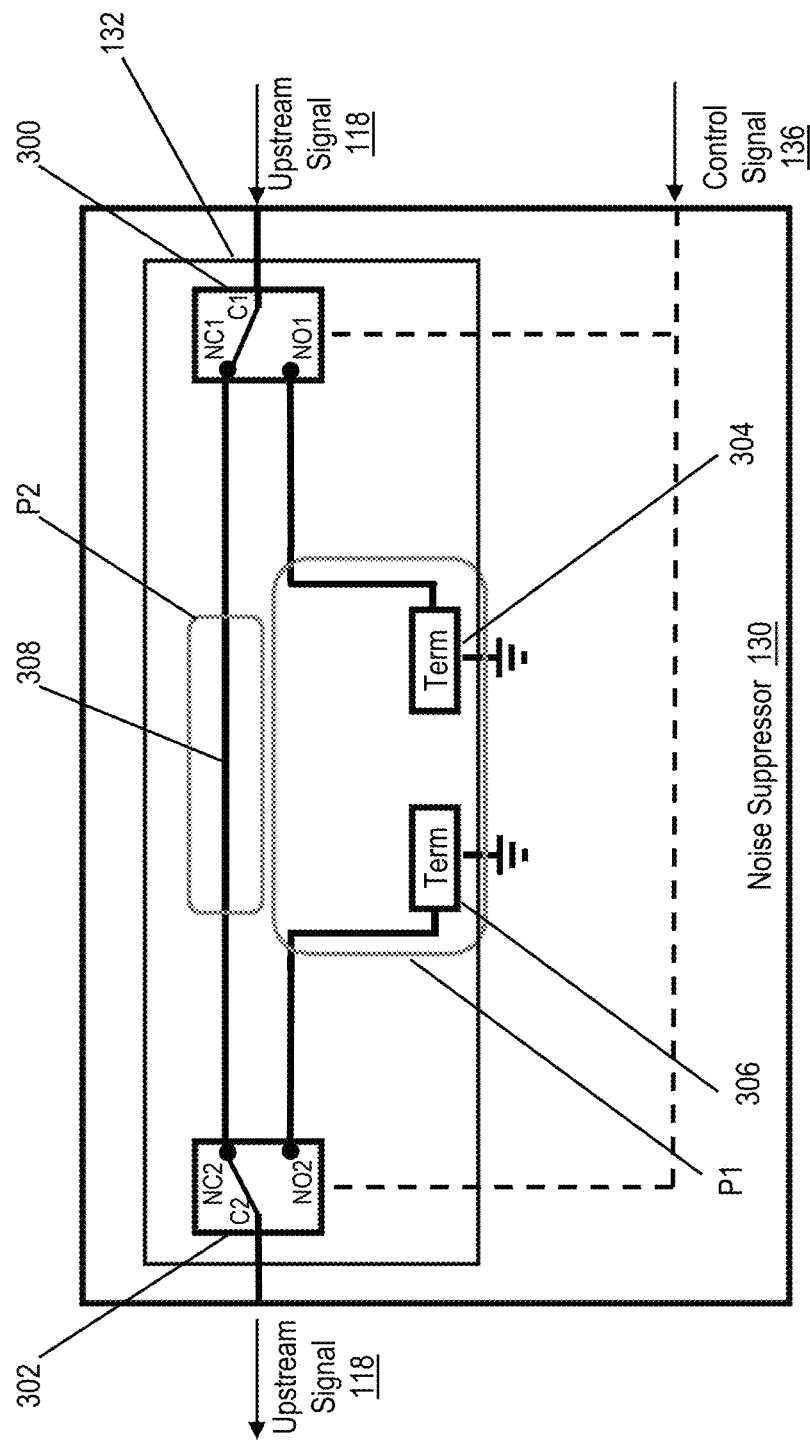
FIG. 3 is a functional block diagram illustrating an exemplary noise suppressor in accordance with aspects of the present disclosure.

FIG. 3 illustrates a functional block diagram of an example of noise suppressor 130 in accordance with some implementations of the present disclosure. Noise suppressor 130 includes switch 132 that selectively routes upstream signal 118 through one of noise suppression paths P1 or P2 based on control signal 136, in a same or similar manner to that previously described above. Switch 132 may include relays 300 and 302. Additionally, noise suppressor 130 may include terminators 304 and 306 in noise suppression path P1, and conductor 308 in noise suppression path P2.

Relays 300 and 302 may be two normally closed, single-pole, dual-throw ("SPDT") relays that may be activated by control signal 136. In implementations, relays 300 and 302 are radio-frequency relays that switch almost instantaneously in response to the assertion of control signal 136, so as to prevent loss of information from upstream signal 118 during switching.

Control signal 136 may selectively activate switch 132 to route upstream signal 118 to noise suppression path P1 via common terminal C1 of relay 300, normally open terminal NO1 of relay 300, and terminator 304. Additionally, to block any signals that are flowing in the reverse direction from upstream signal 118, noise suppression path P1 also may include terminator 306, normally open terminal NO2 of relay 302, and common terminal C2 of relay 302. Terminators 304 and 306 may be, for example, 75 ohm terminators.

Also, control signal 136 may selectively cause switch 132 to route upstream signal 118 to noise suppression path P2 via common terminal C1 of relay 300, normally closed terminal NC1 of relay 300, normally closed terminal NC2 of relay 302, and common terminal C2 of relay 302. The non-activated positions of relays 300 and 302 may establish a direct connection over conductor 308.

As described above and illustrated in FIG. 3, noise suppressor 130 may selectively route upstream signal 118 to one of two different noise suppression paths P1 or P2 based on control signal 136. It is understood, however, that noise suppressor 130 may include more than two paths. For example, additional relays may feed one or more noise suppression devices. Such noise suppression devices may include passive components and/or active components configured to filter ingress noise from upstream signal 118. In such an implementation, for example, each noise suppression device may be configured to filter upstream signal 118 over a different range of frequencies (e.g., 0 MHz-5 MHz and 0 MHz-15 MHz, or 0 MHz-5 MHz and 6 MHz-15 MHz). These frequencies may or may not overlap.

Figure 4:
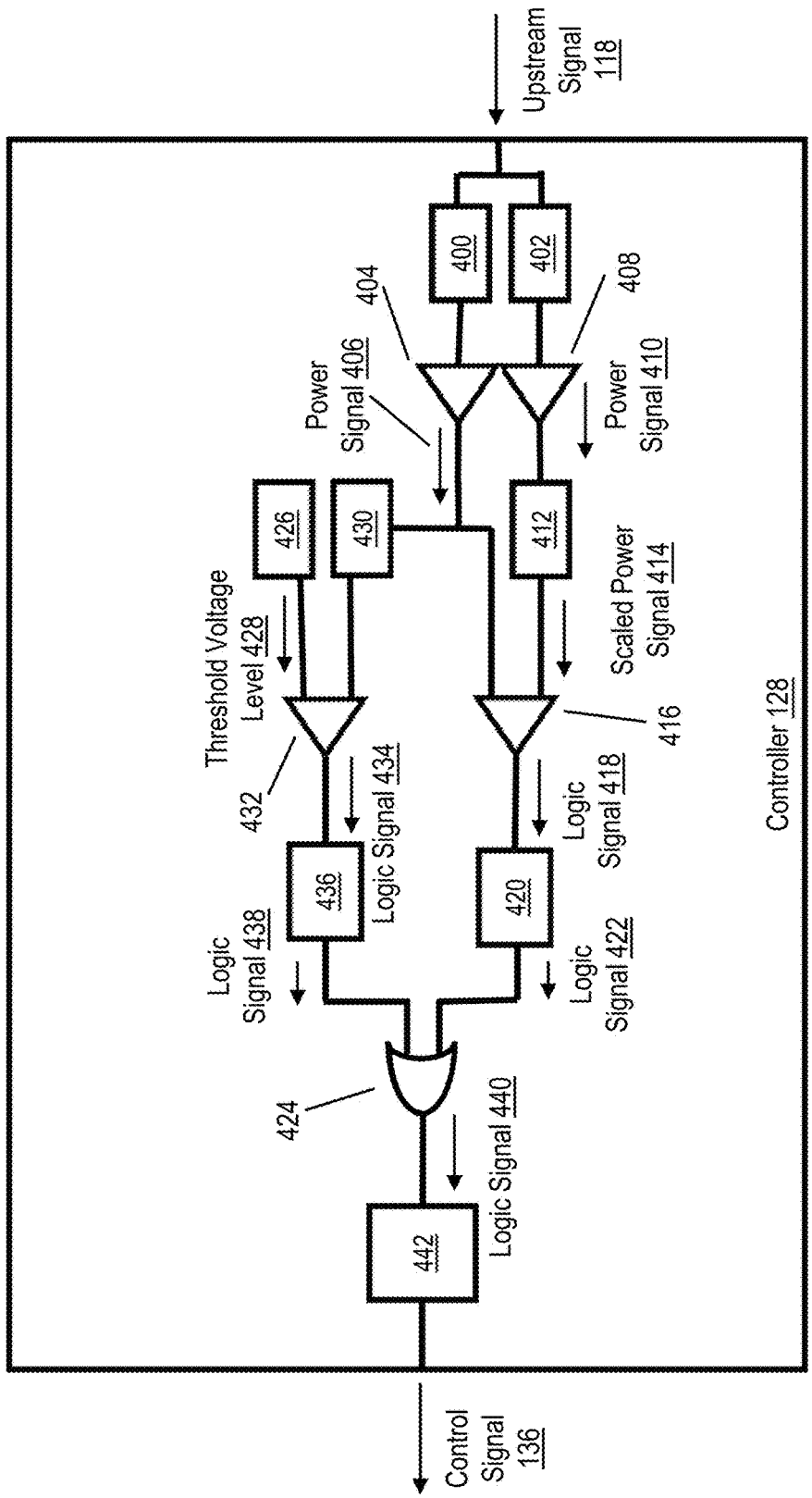
FIG. 4 is a functional block diagram illustrating an exemplary controller in accordance with aspects of the present disclosure.

FIG. 4 illustrates a functional block diagram of an example controller 128 in accordance with some implementations of the present disclosure. Controller 128 determines control signal 136 for controlling relays (e.g., in switch 132) to selectively route upstream signal 118 through one of a number of noise suppression paths (e.g., one of noise suppression paths P1 or P2) as previously described above. In implementations, controller 128 continuously receives a sample of upstream signal 118 from splitter device 134, and provides the sample to filter 400 and filter 402.

Filter 400 may be, for example, a bandpass filter, and it may pass frequencies in a frequency band between 23 MHz and 42 MHz (upper and/or lower limits of this frequency band may be selected, for example, during the design process, e.g., lower limit 20 MHz or 23 MHz, upper limit 40 MHz or 42 MHz). Filter 402 may be, for example, a bandpass filter, and it may pass frequencies in a frequency band between 5 MHz and 24 MHz (upper and/or lower limits of this frequency band may be selected, for example, during the design process, e.g., lower limit 0 MHz or 5 MHz, upper limit 20 MHz or 24 MHz). The frequency band for filter 402 may include lower frequencies than the frequency band for filter 400. The frequency band for filter 402 may overlap the frequency band for filter 400. In the alternative, the frequency band for filter 402 may not overlap the frequency band for filter 400.

Controller 128 provides the output of filter 400 to an input terminal of log amplifier detector 404. Log amplifier detector 404 converts the magnitude of the power of upstream signal 118, as filtered, to power signal 406 having a DC voltage, corresponding to the HBPL of FIG. 2. Controller 128 also provides the output of filter 402 to an input terminal of log amplifier detector 408. Log amplifier detector 408 converts the magnitude of the power of upstream signal 118, as filtered, to power signal 410 having a DC voltage, corresponding to the LBPL of FIG. 2. Power signal 410 is then scaled via scaler 412 to produce scaled power signal 414, corresponding to the SLBPL of FIG. 2. Scaler 412 may be, for example, a voltage divider between an output terminal of log amplifier detector 408 and ground potential, with a tap between those two points. The magnitude of scaled power signal 414 (e.g., SLBPL) may be adjustable, for example, by incorporating a potentiometer into scaler 412.

Controller 128 provides scaled power signal 414 (e.g., SLBPL) and power signal 406 (e.g., HBPL) as inputs to terminals of comparator 416. When scaled power signal 414 is greater than or equal to power signal 406, a resulting logic signal 418 (high) from comparator 416 is sent to an input terminal of comparator timer circuit 420. When scaled power signal 414 is less than power signal 406, a resulting logic signal 418 (low) from comparator 416 is sent to the input terminal of comparator timer circuit 420.

An internal time constant (that may or may not be predetermined) of comparator timer circuit 420 may be greater than or equal to an amount of time necessary to rule out the additive power of valid signal transmissions, so as to serve as a true assessment of ingress noise (e.g., as long as 1 minute to 5 minutes or more). If the resulting logic signal 418 (high) from comparator 416 is sent to comparator timer circuit 420 for a continuous period greater than or equal to the internal time constant of comparator timer circuit 420, then a logic signal 422 (high) is sent from comparator timer circuit 420 to an input terminal of OR gate 424. If the resulting logic signal 418 (low) from comparator 416 is sent to comparator timer circuit 420 or if the resulting logic signal 418 (high) is sent to comparator timer circuit 420 for a period less than the internal time constant of comparator timer circuit 420, then a logic signal 422 (low) is sent from comparator timer circuit 420 to the input terminal of OR gate 424.

Threshold limiter 426 of controller 128 provides threshold voltage level 428, corresponding to the TVL of FIG. 2. Threshold limiter 426 may be, for example, a voltage divider between a DC voltage source (e.g., +5 volts DC) and ground potential, with a tap between those two points. The magnitude of threshold voltage level 428 (e.g., TVL) may be adjustable, for example, by incorporating a potentiometer into threshold limiter 426.

Controller 128 provides threshold voltage level 428 (e.g., TVL) and power signal 406 (e.g., HBPL), via connection 430, as inputs to terminals of comparator 432. Connection 430 may include, for example, a resistor. When power signal 406 is greater than or equal to threshold voltage level 428, the resulting logic signal 434 (high) from comparator 432 is sent to an input terminal of comparator timer circuit 436. When power signal 406 is less than threshold voltage level 428, the resulting logic signal 434 (low) from comparator 432 is sent to the input terminal of comparator timer circuit 436.

An internal time constant (that may or may not be predetermined) of comparator timer circuit 436 may be greater than or equal to an amount of time necessary to rule out the additive power of valid signal transmissions, so as to serve as a true assessment of ingress noise (e.g., as long as 1 minute to 5 minutes or more). If the resulting logic signal 434 (high) from comparator 432 is sent to comparator timer circuit 436 for a continuous period greater than or equal to the internal time constant of comparator timer circuit 436, then a logic signal 438 (high) is sent from comparator timer circuit 436 to an input terminal of OR gate 424. If the resulting logic signal 434 (low) from comparator 432 is sent to comparator timer circuit 436 or if the resulting logic signal 434 (high) from comparator 432 is sent to comparator timer circuit 436 for a period less than the internal time constant of comparator timer circuit 436, then a logic signal 438 (low) is sent from comparator timer circuit 436 to the input terminal of OR gate 424.

As discussed above, if the resulting logic signal 418 (high) from comparator 416 is sent to comparator timer circuit 420 for a continuous period greater than the internal time constant of comparator timer circuit 420, then a logic signal 422 (high) is sent from comparator timer circuit 420 to an input terminal of OR gate 424. And if the resulting logic signal 434 (high) from comparator 432 is sent to comparator timer circuit 436 for a continuous period greater than the internal time constant of comparator timer circuit 436, then a logic signal 438 (high) is sent from comparator timer circuit 436 to an input terminal of OR gate 424.

If logic signal 422 is high, logic signal 438 is high, or both logic signal 422 and logic signal 438 are high, then output logic signal 440 of OR gate 424 also will be high. If both logic signal 422 and logic signal 438 are low, then output logic signal 440 of OR gate 424 also will be low.

Control unit 442 includes hardware logic and/or software logic that selects one of a number (e.g., 2) of logic states for controlling relays 300 and 302 (e.g., in switch 132). In some examples, control unit 442 may include one or more logic gates. In some examples, control unit 442 may include an information processor that selects a logic state based on a lookup table.

Control unit 442 receives output logic signal 440 from OR gate 424 and outputs control signal 136. If output logic signal 440 is high, then control signal 136 controls relays 300 and 302 (e.g., in switch 132) to assume or remain in their activated positions for a long enough time to satisfactorily block ingress noise. If output logic signal 440 is low, then control signal 136 allows relays 300 and 302 (e.g., in switch 132) to assume or remain in their non-activated positions so that upstream signal 118 may pass to an upstream port (e.g., entry port 104) substantially without any filtering, attenuation, or other conditioning to address ingress noise In the alternative, both power signal 406 and power signal 410 (or scaled power signal 414) may be compared to threshold limit voltage(s). In this case, if either or both of power signal 406 and power signal 410 (or scaled power signal 414) exceed the associated threshold limit voltage(s), then the resulting logic signal (high) due to one or both would control relays 300 and 302 (e.g., in switch 132) to assume or remain in their activated positions for a long enough time to satisfactorily block ingress noise.

Although examples have been shown and described in this specification and figures, it would be appreciated that changes may be made to the illustrated and/or described examples without departing from their principles and spirit, the scope of which is defined by the following claims and their equivalents.

We claim:

1. A network interface device, comprising:
   an input-output port;
   an entry port;
   an upstream signal path configured to carry an upstream signal from the input-output port to the entry port;
   a noise suppressor, in the upstream signal path, that comprises first and second noise suppression paths between the input-output port and the entry port; and
   a controller configured to:
     determine a scaled first power level of the upstream signal in a lower frequency band;
     determine a second power level of the upstream signal in a higher frequency band; and
     select the first noise suppression path in response to the scaled first power level being greater than the second power level, or in response to the second power level being greater than a threshold limit.

2. The network interface device of claim 1, wherein the noise suppressor further comprises a switch configured to:
   receive the upstream signal from the input-output port; and
   direct the upstream signal to the first noise suppression path in response to the scaled first power level being greater than the second power level or in response to the second power level being greater than the threshold limit.

3. The network interface device of claim 1, wherein both of the first and second noise suppression paths apply a different level of filtering to the upstream signal.

4. The network interface device of claim 1, wherein the lower frequency band overlaps the higher frequency band.

5. The network interface device of claim 1, wherein the lower frequency band does not overlap the higher frequency band.

6. A network interface device, comprising:
   an input-output port;
   an entry port;
   an upstream signal path configured to carry an upstream signal from the input-output port to the entry port;
   a controller configured to:
     determine a scaled first power level of the upstream signal in a first frequency band; and
     determine a second power level of the upstream signal in a second frequency band; and
   a noise suppressor configured to block the upstream signal in response to the scaled first power level being greater than the second power level, or in response to the second power level being greater than a threshold limit.

7. The network interface device of claim 6, wherein the noise suppressor is configured to block the upstream signal in response to the scaled first power level being greater than the second power level.

8. The network interface device of claim 6, wherein the noise suppressor is configured to block the upstream signal in response to the second power level being greater than the threshold limit.

9. A network interface device, comprising:
   an input-output port;
   an entry port;
   an upstream signal path configured to carry an upstream signal from the input-output port to the entry port;
   a noise suppressor, in the upstream signal path, that comprises a plurality of noise suppression paths between the input-output port and the entry port; and
   a controller configured to:
     determine a scaled first power level of the upstream signal in a first frequency band;
     determine a second power level of the upstream signal in a second frequency band; and
     select a first noise suppression path of the plurality of noise suppression paths in response to the scaled first power level being greater than the second power level, or in response to the second power level being greater than a threshold limit.

10. The network interface device of claim 9, wherein the noise suppressor further comprises a switch configured to:
    receive the upstream signal from the input-output port; and
    direct the upstream signal to the first noise suppression path in response to the scaled first power level being greater than the second power level, or in response to the second power level being greater than the threshold limit.

11. The network interface device of claim 9, wherein each of the plurality of noise suppression paths applies a different level of filtering to the upstream signal.

12. The network interface device of claim 9, wherein the first noise suppression path entirely blocks the upstream signal.

13. The network interface device of claim 9, wherein the first noise suppression path provides no filtering to the upstream signal.

14. The network interface device of claim 9, wherein the first noise suppression path entirely blocks the upstream signal, and
   wherein a second noise suppression path of the plurality of noise suppression paths provides no filtering to the upstream signal.

15. The network interface device of claim 9, wherein the first frequency band includes lower frequencies than the second frequency band.

16. The network interface device of claim 9, wherein the first frequency band overlaps the second frequency band.

17. The network interface device of claim 9, wherein the first frequency band does not overlap the second frequency band.

\* \* \* \* \*